Figure 1:
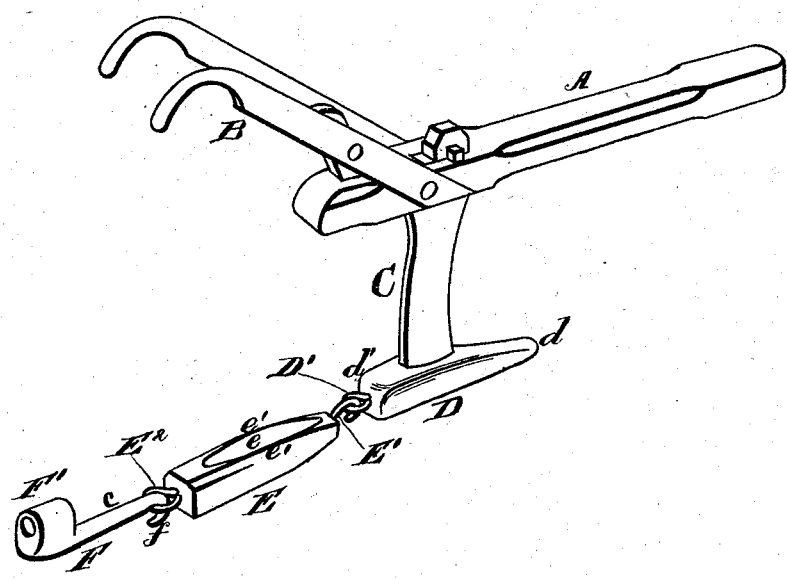

A. SWIFT.
DITCHING AND DRAINING MACHINE.

No. 190,096. Patented April 24, 1877.

WITNESSES

INVENTOR
Almon Swift

Gilmore Smith & Co.
ATTORNEYS

UNITED STATES PATENT OFFICE.

ALMON SWIFT, OF EAST ELMORE, VERMONT.

IMPROVEMENT IN DITCHING AND DRAINING MACHINES.

Specification forming part of Letters Patent No. 190,096, dated April 24, 1877; application filed January 27, 1877.

*To all whom it may concern:*

Be it known that I, ALMON SWIFT, of East Elmore, in the county of Lamoille and State of Vermont, have invented a new and valuable Improvement in Ditching and Draining Machine; and I do hereby declare that the following is a full, clear, and exact description of the construction and operation of the same, reference being had to the annexed drawing, making a part of this specification, and to the letters and figures of reference marked thereon.

The figure of the drawing is a representation of a perspective view of my ditching and draining machine.

The object of this invention is to provide means for plowing a continuous under-drain for wet land, and for laying a drain-pipe therein.

The novelty consists in the combination and arrangement of the parts, as will be hereinafter more fully set forth and claimed.

In the accompanying drawing, A designates an ordinary plow-beam, having the usual plow-handles B attached thereto, and C designates a plow-standard, which extends up through a slot in said beam A, and is secured firmly thereto. Said standard is made sufficiently long to reach below the arable soil, and its front is brought to an edge, so as to form a cutter, for cutting through the same. Said standard carries on its lower end a furrowing-bar or solid plow, D, which is flat underneath and rounded above, and increases in thickness from its sharp front edge or point $d$ to its butt $d'$. To said butt is attached a hook, D'.

E designates a larger tapering bar or drag, which is longitudinally recessed at $e$, so as to leave sharp upper edges $e'$ $e'$, and is provided with a front hook, $E^1$, adapted to catch over hook D', and with a rear eye, $E^2$. Edges $e'$ $e'$ operate upon the earth at the sides of the groove or under-ground furrow, made by furrowing plow or bar D, and close the top of said groove or furrow. The greater size of drag E causes it to pack the earth firmly on the sides of said drain, thus preventing it from being clogged.

F designates a pipe-laying attachment consisting of a small cylindrical shaft, $c$, having a front hook, $f$, which catches upon the eye $E^2$ above described, and having also at its rear a socket or perforated block, F', which holds the end of a leaden drain-pipe. By means of the above devices an under-ground drain-pipe may be laid in a covered tubular passage or drain by the same continuous plowing motion which forms and covers said passage.

What I claim as new, and desire to secure by Letters Patent, is—

The draining-machine herein described consisting of the plow D, having the eye D', the drag E, made larger than the plow, and provided with the hook $E^1$, eye $E^2$, cutting-edges $e'$ $e'$, and recess $e$, and the pipe-laying attachment F, having a small cylindrical shaft, $c$, with a front hook, $f$, and a rear perforated block, F', the whole constructed, arranged, and operating in the manner and for the purpose set forth.

In testimony that I claim the above I have hereunto subscribed my name in the presence of two witnesses.

ALMON SWIFT.

Witnesses:
 CAROLINE BAILEY,
 SARAH C. BAILEY.